Figure 1:
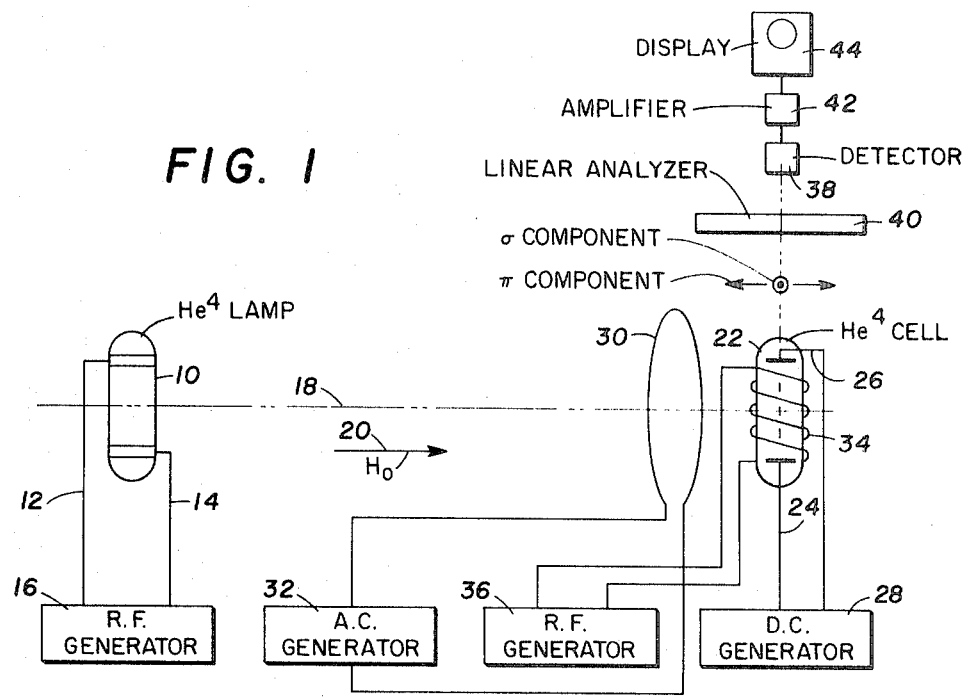

United States Patent

[11] 3,628,130

[72] Inventor Laird D. Schearer
Dallas, Tex.
[21] Appl. No. 649,882
[22] Filed June 29, 1967
[45] Patented Dec. 14, 1971
[73] Assignee Texas Instruments Incorporated
Dallas, Tex.

[54] METHOD AND APPARATUS FOR MEASURING THE ALIGNMENT OF METASTABLE HE ATOMS BY DETECTION OF SCATTERED RESONANCE RADIATION
4 Claims, 3 Drawing Figs.

[52] U.S. Cl. .................................................. 324/0.5 R
[51] Int. Cl. ....................................................... G01r 33/08
[50] Field of Search ............................................. 324/0.5; 331/3, 94

[56] References Cited
UNITED STATES PATENTS

| | | | |
|---|---|---|---|
| 3,122,702 | 2/1964 | Franken | 324/0.5 |
| 3,192,472 | 6/1965 | Bender | 324/0.5 |
| 3,197,694 | 7/1965 | Cunningham | 324/0.5 |
| 3,206,671 | 9/1965 | Colegrove | 324/0.5 |

Primary Examiner—Michael J. Lynch
Attorneys—Samuel M. Mims, Jr., James O. Dixon, Andrew M. Hassell, Harold Levine, Richards, Harris & Hubbard, V. Bryan Medlock, Jr., Harold E. Meier and John E. Vandigriff ABSTRACT: A magnetometer having $He^4$ atoms excited to the metastable $2^3S_1$ state is radiated with unpolarized resonance radiation to align the atoms in the metastable state. The scattered resonance radiation issuing from the $He^4$ atoms in the metastable state is sensed to provide an indication of the alignment of the atoms. A differential function of two polarized components of the scattered resonance radiation may be generated to provide an output signal that is generally free from noise.

Patented Dec. 14, 1971

3,628,130

INVENTOR

LAIRD D. SCHEARER

ATTORNEY

METHOD AND APPARATUS FOR MEASURING THE ALIGNMENT OF METASTABLE HE ATOMS BY DETECTION OF SCATTERED RESONANCE RADIATION

This invention relates to helium magnetometers, and more particularly to He⁴ magnetometers wherein improved output signal magnitudes are provided by sensing scattered resonance radiation.

It has heretofore been known to excite the ground-state atoms of a helium cell to a metastable energy level and to radiate the helium cell with unpolarized resonance radiation to cause alignment of the atoms in the metastable state. Such alignment of the metastable atoms is particularly useful in magnetometers, in which the alignment of the metastable atoms is altered by the application of a varying radiofrequency magnetic field and the amount of the alignment alteration is detected as a function of variance in the frequency of the radiofrequency magnetic field.

The detection of the variance in the alignment of the metastable helium atoms has heretofore been accomplished by measuring the amount of unabsorbed resonance radiation passing through the helium cell. A detailed disclosure and description of magnetometers utilizing detection of the unabsorbed resonance radiation is disclosed in U.S. Pat. No. 3,071,721, issued Jan. 1, 1963, and in U.S. Pat. No. 3,122,702, issued Feb. 25, 1964. While such prior systems have produced output resonance signals generally indicative of the amount of alignment variance in the metastable energy level, the signals have generally been relatively weak and, particularly in the case of helium magnetometers, have had a broad resonance line width of on the order of a milligauss, thus limiting the usefulness of the systems in magnetometry where high sensitivity is required. Further, the direct detection of the amount of high-intensity radiation passing through the aligned helium atoms has often required a complex and bulky collimating system, and has eliminated the use of sensitive detection devices which saturate at high radiation intensity levels.

It has also heretofore been known to monitor scattered light from an optically oriented gas to determine the magnetic resonance of the gas. A disclosure of such a system is disclosed and described in the publication by J. Brossel and F. Bitter, PHYSICAL REVIEW 86,308 (1952). However, such monitoring of scattered light has not heretofore been used in combination with radiation of unpolarized light upon metastable He⁴ atoms, and has not in the past generated output resonance signals having magnitudes substantially different from the magnitudes provided in observing the amount of resonance radiation directly transmitted through a sample cell.

In an effort to eliminate disadvantages present in the use of unpolarized resonance radiation in helium magnetometers, systems have heretofore been developed which utilize circularly polarized resonance radiation. Such systems have provided considerably large output resonance signals than the previously developed unpolarized radiation systems, thus enabling the construction of highly sensitive magnetometers. Such systems are disclosed and described in detail in the previously mentioned U.S. Pat. No. 3,122,702; U.S. Pat. No. 3,206,671, issued Sept. 14, 1965; and in U.S. Pat. No. 3,211,994, issued Oct. 12, 1965. However, certain disadvantages are introduced by the use of circularly polarized light as a result of a significant energy shift of the energy levels produced by the pumping light. This energy shift gives rise to a dependence upon the apparent ambient magnetic field upon the orientation of the magnetometer, thus causing inaccuracies in practical usage. Multiple polarized beam configurations have been proposed to cancel out such light shifts introduced by polarized light, but have not proved totally satisfactory with respect to magnetometer sensitivity.

In accordance with the present invention, a method and apparatus for detecting the amount of variance in the alignment of helium atoms in a metastable state has been discovered which allows the usage of unpolarized resonance radiation while providing high-magnitude output resonance signals. He⁴ atoms excited to the metastable $2^3S_1$ state are radiated with unpolarized resonance radiation along a radiation path. The resonance radiation scattered by the He⁴ atoms in the metastable state is sensed to provide a high-magnitude, low-noise output signal representative of the alignment of the He⁴ atoms in the metastable state. The scattered resonance radiation may be detected by disposing the detector at a substantial angle with respect to the path of resonance radiation, or may alternatively be detected by excluding the unabsorbed resonance radiation passing directly through the He⁴ atoms in the metastable state.

Figure 2:
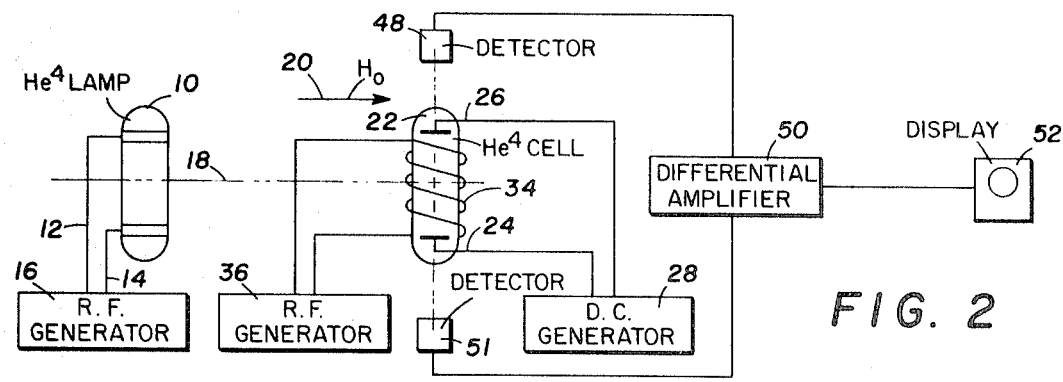
Figure 3:
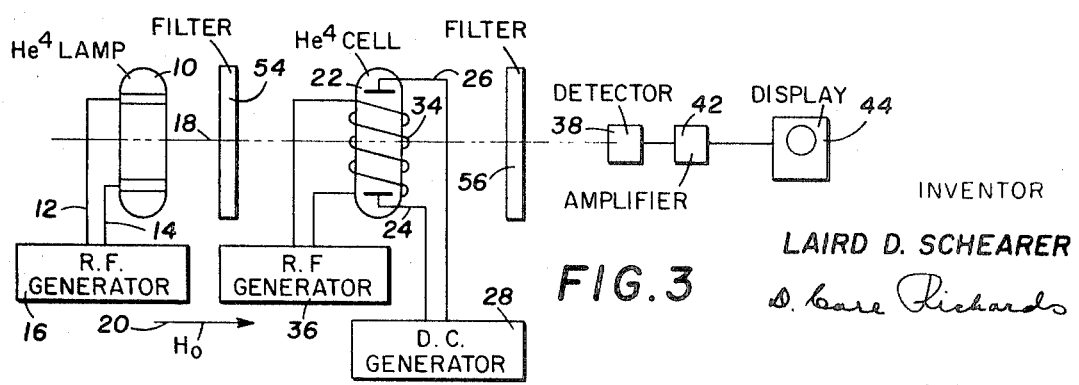

For a more complete understanding of the present invention and for further objects and advantages thereof, reference may now be had to the following description taken in conjunction with the accompanying drawings in which:

FIG. 1 diagrammatically illustrates one embodiment of the present invention;

FIG. 2 diagrammatically illustrates a second form of the invention utilizing differentiation between polarized components of the scattered resonance radiation; and FIG. 3 illustrates in somewhat diagrammatic form another embodiment of the present invention utilizing filters to exclude resonance radiation passing directly through the He⁴ cell.

The present invention is directed to an improvement in the optical pumping process of He⁴ utilizing unpolarized resonance radiation disclosed in the previously noted U.S. Pat. No. 3,122,702. Briefly, the process described in this patent produces metastable helium atoms in the state generally denoted as $2^3S_1$ by means of an electrical discharge within a closed vessel containing gaseous helium. A helium arc lamp is disposed nearby the closed vessel and emits resonance radiation in the near infrared range of the electromagnetic spectrum. If the radiation is projected colinear with the ambient magnetic field, the metastable helium atoms will be generally aligned and a maximum amount of resonance radiation will pass through the closed vessel.

The alignment of the metastable helium atoms is then diminished by the application of a radiofrequency magnetic field, and the metastable helium atoms absorb an increased amount of the resonance radiation. By holding the strength of the radiofrequency magnetic field constant and varying the frequency thereof, a point will be reached where a maximum amount of absorption of the resonance radiation occurs, thus indicating the maximum extent of nonalignment of metastable atoms. By monitoring the amount of transmitted resonance radiation which is not absorbed by the metastable helium atoms and determining the frequency of the alternating magnetic field at which the transmitted resonance radiation reached a minimum, the strength of the ambient magnetic field may be directly determined.

With the practice of the method disclosed in U.S. Pat. No. 3,122,702, it may be shown that the change in the intensity of the transmitted resonance radiation as the helium sample goes from the unpumped to the pumped condition is $$\Delta I \text{ (transmitted)} = 2(N_0 - N/3)(A - B) \quad (1)$$

where $N_0$ is the density of the $2^3S_1$, $m=0$ level, $N$ is the total metastable population density, and $A$ and $B$ are the intensities of the $D_0$ and $D_2$ components of the pumping resonance radiation, the $D_1$ and $D_2$ components being generally equal. In such prior systems, the intensities $A$ and $B$ of the $D_0$ and $D_2$ components of the pumping radiation are very nearly equal, thereby resulting in relatively small amplitude output resonance radiation signals.

The present invention is directed to the surprising discovery that the scattered resonance radiation from a He⁴ cell radiated with unpolarized resonance radiation produces a substantially higher change of intensity signal than the unabsorbed resonance radiation which is transmitted directly through the He⁴ cell. While scattered resonance radiation from radiated substances such as sodium has been heretofore observed, the resonance radiation outputs of such systems have generally been approximately equal to the output from the detection of unabsorbed resonance radiation passing through the substance. The results produced by the present discover are thus unexpected. The results may be explained by reference to the following formulas for intensity of scattered radiation from He[4], which are derived from the relative transition probabilities of the steady-state populations of the nine magnetic sublevels of the $2^3P_{0,1,2}$ states of He[4], wherein for scattered $\pi$ radiation $$I\pi = \frac{1}{9}[2N(A+B)+N_o(-2A+16B)] \quad (2)$$

and for $\sigma$ radiation $$I\sigma = \frac{1}{9}[2N(A+7)-N_o(2A+5B)] \quad (3)$$

where $N$ is the total metastable density, $N_o$ is the density of the $2^3S_1$, $m=0$ level, and $A$ and $B$ are the intensities of the $D_o$ and $D_2$ components of the pumping radiation, and wherein $D_1$ equals $D_2$.

The level population $N_o$ is modified by the pumping of the resonance radiation, and consequently the scattered resonance radiation contains information about the S state alignment of the helium atoms. The output resonance radiation signal is defined in the conventional manner as the change in the intensity of the scattered resonance radiation as the metastable atoms are aligned by the pumping resonance radiation. The changes in intensities of the $\pi$ and $\sigma$ components of the scattered radiation at 90° to the ambient magnetic field may then be defined as $$\Delta I\pi = \frac{1}{9}(N_o-N/3)(16B-2A) \quad (4)$$

and $$\Delta I\sigma = \frac{1}{9}(N_o-N/3)(2A+5B) \quad (5)$$

in which the symbols correspond to those previously defined.

By comparing the change of intensities of scattered resonance radiation defined in equations (4) and (5) with the change of intensity of the transmitted resonance radiation defined in equation (1), it will be seen that the $A$ and $B$ terms of the scattered resonance radiation equations are not subject to the mutual cancellation of terms comparable in magnitude as is equation (1). Consequently, the detected change in intensity of the scattered resonance radiation may be up to several hundred times the magnitude of the change of intensity of the transmitted resonance radiation heretofore utilized in monitoring He[4] magnetometers.

By eliminating the necessity of detecting intensity changes in the intense light from a resonance radiation pumping source, the present invention provides an output with an improved signal to noise ratio. Additionally, very sensitive detection circuitry may be utilized with the invention, such as avalanche photodiodes which were heretofore unusable due to their saturation by high radiation levels.

Referring now to FIG. 1, suitable apparatus for the practice of the present method may comprise a helium lamp 10 containing pure He[3] or He[4] gas and having electrodes 12 and 14 connnected across an RF generator 16. The lamp 10 serves as a source of unpolarized resonance radiation radiating generally along the axis 18 which is colinear with the direction of the ambient magnetic field designated generally by the arrow 20. Lamp 10 thus directly radiates a helium cell 22 which also contains pure He[4] gas. The He[4] cell 22 is excited through electrodes 24 and 26 by a DC generator 28 in order to excite the ground-state helium atoms to the metastable $2^3S_1$ state in the manner well known.

The Helmholtz coil 30 may be excited by an AC generator 32 and disposed in the resonance radiation field to lightly modulate the magnetic field being measured. By suitable connections to a display oscilloscope, to be later described, visual signals may be displayed by supplying a voltage signal proportional to the modulation signal to the horizontal sweep of the oscilloscope. An RF coil 34 is disposed around the He[4] cell 22 and connected to an RF generator 36 in order to impress a variable radiofrequency magnetic field upon the aligned metastable atoms in the He[4] cell 22. The coil 34 should be disposed to produce a magnetic field having some components substantially at right angles to the axis of the ambient magnetic field being measured so that there will be magnetic field lines operating to alter the alignment of the metastable helium atoms.

In accordance with the present invention, only the scattered resonance radiation issuing from the He[4] cell 22 is detected to determine the alteration in the alignment of the helium atoms. The embodiment of the circuitry shown in FIG. 1 detects this scattered radiation with an infrared detector 38 disposed at a substantial angle from the line of radiation 18 and the ambient magnetic field 20. In the embodiment illustrated, the angle is approximately 902 92°which has been found to provide a maximum output resonance radiation signal. Other angles between the detector 38 and the line of the ambient magnetic force could be utilized, with somewhat reduced output signal magnitudes, the only requirement being that the detector 38 is not placed in such a position as to detect the unabsorbed resonance radiation passing directly through the He[4] cell 22.

As is well known, the scattered resonance radiation from the He[4] cell 22 comprises $\pi$ and $\sigma$ components. As illustrated in equations (4) and (5), the relative magnitudes and polarities of the two components differ, the magnitude of the $\pi$ component being generally twice the magnitude of the $\sigma$ component at 90° from the ambient magnetic field. Therefore, a linear analyzer 40 is disposed between the He[4] cell 22 and the detector 38 in order to allow selectivity between either of the two components of the scattered resonance radiation, or between desired combinations of the scattered resonance radiation, or between desired combinations of the components. The linear analyzer 40 polarizes infrared light in dependency upon the angular position of the analyzer. A suitable linear analyzer is manufactured and sold by Polaroid Corporation under the designation Type HR Linear Polarizer.

The output representative of the change in intensity of the scattered resonance radiation generated by the infrared detector 38 is amplified by amplifier 42 and fed into a display device 44, which may be for instance an oscilloscope which has its horizontal sweep modulated by the AC generator 32.

It will also be understood that the embodiment illustrated in FIG. 1 could be utilized in an ambient magnetic filed having a direction perpendicular to the magnetic field direction shown by arrow 20. In such a magnetic field, the system illustrated in FIG. 1 would remain substantially the same, with the exception that the linear analyzer 40 may be moved to a position between the He[4] lamp 10 and the He[4] cell 22. As the output resonance radiation signal provided by the present system is somewhat dependent upon the general direction of the ambient magnetic field, in actual practice three identical systems would be disposed along orthogonal axes in order to provide at least one accurate indication of the magnitude of the ambient magnetic field at all times.

FIG. 2 illustrates another embodiment of the present invention wherein the opposite polarities of the $\pi$ and $\sigma$ components of the scattered resonance radiation are utilized to advantage to eliminate substantial amounts of noise in the output resonance radiation signal. In FIG. 2, wherein reference numerals corresponding to like parts shown in FIG. 1 are utilized where possible, the He[4] lamp 10 is excited by the RF generator 16 to emit unpolarized resonance radiation along the axis 18 to the He[4] cell 22. The He[4] atoms in the cell 22 are excited by the DC generator 28 to the metastable $2^3S_1$ state, and are aligned in the metastable state by the radiation from lamp 10. The RF generator 26 creates an alternating magnetic field to disturb the alignment of the metastable atoms, in the manner previously described.

The resonance radiation issuing from the He[4] lamp 10 is absorbed by the metastable helium in cell 22, and reradiated as scattered resonance radiation. A detector 48 disposed at 90° from the axis of radiation includes a linear analyzer and is responsive only to the $\pi$ component of the scattered resonance radiation to generate an output signal which is fed into one input of a differential amplifier 50. As may be seen with reference to equation (4), a change in the intensity of the $\pi$ component is a positive polarity signal.

A detector 51 is disposed substantially 90° from the axis of radiation and includes a suitable linear analyzer to detect only the $\sigma$ component of the scattered resonance radiation issuing from the He⁴ cell 22. As may be seen with reference to equation (5), the change of intensity of the σ signal is a negative polarity signal which is fed into the second input of the differential amplifier 50. The noise in the signals generated by detectors 48 and 51 will be substantially cancelled due to operation of the differential amplifier 50, while the π and σ components add to provide an output signal from the amplifier 50 indicative of the alignment of the metastable helium atoms in cell 22.

The output from the differential amplifier is displayed on a suitable display 52, which may be for instance an oscilloscope modulated by suitable Helmholtz coils in the well-known manner described with reference to FIG. 1. The display enables the determination of the magnitude of the ambient magnetic field in the well-known manner. The novel configuration presented in FIG. 2 would enable a very compact magnetometer instrument to be constructed without the requirement of collimating lenses and the required focal distances.

FIG. 3 illustrates another embodiment of the invention wherein the infrared detector is not required to be at an angle with respect to the axis of resonance radiation, due to the fact that the unabsorbed resonance radiation passing through the He⁴ cell is excluded from the detector by suitable devices. Like numerals in FIG. 3 have been utilized for corresponding parts previously described. A polarized light filter 54 is disposed between the radiating He⁴ lamp 10 and the He⁴ cell 22 in order to filter out all components of the radiated resonance radiation in one polarized plane. A second light filter 56 is disposed between the He⁴ cell 22 and the detector 38 and is polarized to filter out all radiation components in a plane perpendicular to the polarized plane of filter 54. In this manner, substantially all of the resonance radiation directed issuing from lamp 10 will be excluded from impingement on the detector 38. However, as the He⁴ cell 22 absorbs a portion of the resonance radiation and reradiates scattered resonance radiation which is not polarized in one plane, components of the scattered resonance radiation will pass through the filter 56 of the detector 38.

The infrared detector 38 will thus be responsive primarily to the scattered resonance radiation in accordance with the invention, thereby providing an output signal of magnitude as much as one hundred times the magnitude of the signal provided by directly detecting the unabsorbed resonance radiation. It will be understood that other methods are available to exclude the unabsorbed resonance radiation from the detector 38, such as modulating the radiation from lamp 10 with a fixed frequency and then filtering out the frequency before detecting.

The present invention thus provides a method and apparatus for providing extremely high-magnitude output resonance radiation signals in a He⁴ magnetometer. The present invention provides results comparable in magnitude and sensitivity to that obtained in magnetometers using circularly polarized pumping sources, without the disadvantage of the inherent energy level shift in such systems. As the detection of the present system is concerned with comparatively low-amplitude scattered discharges from the He⁴ cell in place of the previously utilized directly radiated resonance radiation through a He⁴ cell, a higher signal-to-noise ratio is provided by the present invention.

Additionally, very sensitive low-level detecting devices such as avalanche photodiodes may be utilized with this invention, whereas the use thereof was prohibited in previous systems which required the detection of extremely high-intensity direct resonance radiation. Further, complex and bulky collimating lenses are not required to focus the resonance radiation as has been required in previous systems.

I claim:

1. A method for producing high-magnitude signals from He⁴ atoms excited to the metastable $2^3S_1$ state which comprises:
    a. radiating said He⁴ atoms in said metastable state with unpolarized resonance radiation along a radiation path such that a substantial difference exists in the effective magnitudes of the intensities of the $D_0$ and $D_2$ scattered resonance radiation components, said difference resulting in a substantially greater magnitude of change of intensity of the scattered resonance radiation than of the unabsorbed resonance radiation transmitted through the He⁴ atoms, and
    b. generating a signal in response to a selected polarized component of the resonance radiation scattered by the He⁴ atoms in said metastable state.

2. A method for measuring the magnitude of an ambient magnetic field acting upon He atoms excited to a metastable state comprising:
    a. radiating said He atoms with unpolarized resonance radiation along a radiation axis to align said atoms in said metastable state such that the change in intensity of the resonance radiation scattered by said atoms is substantially greater than the change in intensity of the unabsorbed resonance radiation directly transmitted through said atoms,
    b. subjecting said radiated atoms to an alternating magnetic field to alter the alignment of said atoms,
    c. generating a signal in response to the magnitude of the scattered resonance radiation from said radiated atoms to determine the amount of alteration of the alignment of said atoms,
    d. sensing two polarized components of opposite polarities of said scattered resonance radiation, and
    e. subtracting said polarized components to produce a differential signal indicative of the amount of alteration of the alignment of said atoms.

3. In an apparatus for measuring the change in atom alignment, the combination comprising:
    a. a He cell having atoms excited to a metastable state,
    b. a source of unpolarized resonance radiation for radiation said He cell along an optical axis to cause alignment of said atoms in said metastable state, wherein the change in intensity of the resonance radiation scattered by said cell is substantially greater than the change in intensity of the unabsorbed resonance radiation directly transmitted through said cell,
    c. means for subjecting said He cell to an alternating magnetic field to change the alignment of said atoms,
    d. detector means for generating an output signal in response to the scattered resonance radiation from said He cell to provide an indication of the change in alignment of said atoms,
    e. means for separately sensing two polarized components of opposite polarity of said scattered resonance radiation, and
    f. means for subtracting said polarized components to produce a differential signal generally free from noise.

4. In an apparatus for measuring the change in atom alignment, the combination comprising:
    a. a He cell having atoms excited to a metastable state,
    b. a source of unpolarized resonance radiation for radiating said He cell along an optical axis to cause alignment of said atoms in said metastable state, wherein the change in intensity of the resonance radiation scattered by said cell is substantially greater than the change in intensity of the unabsorbed resonance radiation directly transmitted through said cell,
    c. means for subjecting said He cell to an alternating magnetic field to change the alignment of said atoms,
    d. detector means for generating an output signal in response to the scattered resonance radiation from said He cell to provide an indication of the change in alignment of said atoms, and
    e. polarized linear analyzer means disposed between said He cell and said detector means for excluding one component of said scattered resonance radiation.

* * * * *